(12) United States Patent
Sato

(10) Patent No.: US 10,378,587 B2
(45) Date of Patent: Aug. 13, 2019

(54) MAGNETIC FLUID SEAL

(71) Applicant: EAGLEBURGMANN JAPAN CO., LTD., Tokyo (JP)

(72) Inventor: Kazuhiko Sato, Tokyo (JP)

(73) Assignee: EAGLEBURGMANN JAPAN CO., LTD. (JP)

( * ) Notice: Subject to any disclaimer, the term of this patent is extended or adjusted under 35 U.S.C. 154(b) by 0 days.

(21) Appl. No.: 15/769,056

(22) PCT Filed: Nov. 9, 2016

(86) PCT No.: PCT/JP2016/083197
§ 371 (c)(1),
(2) Date: Apr. 17, 2018

(87) PCT Pub. No.: WO2017/082284
PCT Pub. Date: May 18, 2017

(65) Prior Publication Data
US 2018/0306246 A1    Oct. 25, 2018

(30) Foreign Application Priority Data

Nov. 11, 2015 (JP) ................................ 2015-221246

(51) Int. Cl.
*F16C 19/04* (2006.01)
*F16C 33/76* (2006.01)
(Continued)

(52) U.S. Cl.
CPC .......... *F16C 33/765* (2013.01); *F16C 37/007* (2013.01); *F16J 15/43* (2013.01);
(Continued)

(58) Field of Classification Search
CPC ........ F16C 33/765; F16C 37/007; F16J 15/43
See application file for complete search history.

(56) References Cited

U.S. PATENT DOCUMENTS

| 5,826,885 A | * | 10/1998 | Helgeland ............... F16J 15/162 |
| | | | 277/302 |
| 5,975,536 A | * | 11/1999 | Helgeland ................ F16J 15/43 |
| | | | 277/410 |

(Continued)

FOREIGN PATENT DOCUMENTS

| CN | 2447583 | 9/2001 | ............... F16J 15/53 |
| CN | 203963026 | 11/2014 | ............... F16J 15/43 |

(Continued)

OTHER PUBLICATIONS

International Search Report and Written Opinion (w/translation) issued in application No. PCT/JP2016/083197, dated Dec. 6, 2016 (14 pgs).

(Continued)

*Primary Examiner* — Phillip A Johnson
(74) *Attorney, Agent, or Firm* — Hayes Soloway P.C.

(57) ABSTRACT

A magnetic fluid seal includes an outer cylinder member with a heat barrier that internally houses a rotating shaft extending from a housing of a fluid machine and includes an attachment portion to be attached to the housing, magnetic pole members that are disposed around the rotating shaft housed in the outer cylinder member and form a magnetic circuit, and sealing films that are magnetically connected to the magnetic circuit, are respectively disposed between the magnetic pole members and the rotating shaft, are made of magnetic fluids, and are formed in an axial direction.

11 Claims, 3 Drawing Sheets

(51) Int. Cl.
  *F16J 15/43* (2006.01)
  *F16C 37/00* (2006.01)
  *F16C 35/12* (2006.01)
  *F16C 33/74* (2006.01)
  *F16C 19/08* (2006.01)

(52) U.S. Cl.
  CPC ............ *F16C 19/08* (2013.01); *F16C 33/746* (2013.01); *F16C 35/12* (2013.01); *F16C 37/005* (2013.01); *F16C 2300/62* (2013.01)

(56) References Cited

U.S. PATENT DOCUMENTS

| | | | |
|---|---|---|---|
| 6,192,603 B1 | 2/2001 | Seita | 34/559 |
| 2008/0036155 A1 | 2/2008 | Shimazaki et al. | F01D 11/02 |
| 2017/0248168 A1* | 8/2017 | Yamashita | F16C 33/82 |

FOREIGN PATENT DOCUMENTS

| | | | | |
|---|---|---|---|---|
| JP | S6187265 | 6/1986 | | F16J 15/40 |
| JP | H10169789 | 6/1998 | | F16J 15/43 |
| JP | 2000074227 | 3/2000 | | B25J 19/00 |
| JP | 2003314706 | 11/2003 | | F16J 15/43 |
| WO | WO-2013069403 A1 * | 5/2013 | | F16C 33/6644 |

OTHER PUBLICATIONS

Taiwanese Office Action (w/translation) issued in application No. 105136713, dated Dec. 21, 2017 (8 pgs).

International Preliminary Report on Patentability (translation) issued in application No. PCT/JP2016/083197, dated May 24, 2018 (7 pgs).

First Chinese Official Action for Chinese Patent Application Serial No. 201680065518.0, dated Jun. 5, 2019 with English translation (13 pgs).

* cited by examiner

MAGNETIC FLUID SEAL

TECHNICAL FIELD

The present invention relates to a magnetic fluid seal used, for example, under a high-temperature environment.

BACKGROUND ART

A magnetic fluid seal has conventionally been known as a long-lived and clean high-performance seal. This magnetic fluid seal is widely used during a manufacturing process without maintenance of semiconductors or liquid crystals requiring a clean atmosphere, especially its various coating and etching steps.

The magnetic fluid seal uses a sealing film made of a magnetic fluid, and respectively formed between magnetic pole member held inside an outer cylinder member fixed to a housing of a fluid machine and a rotating shaft to seal a gap between the housing and the rotating shaft of the fluid machine.

The sealing film is formed in the magnetic fluid seal. If the fluid sealed to the fluid machine, for example, is a high-temperature gas, heat conducts from the high-temperature gas to the outer cylinder member, and a temperature of the magnetic pole member within the outer cylinder member gradually increases, and the temperature of the sealing film made of the magnetic fluid consequently increases, and when this temperature excessively increases, a base liquid of the magnetic fluid vaporizes, and sealability of the sealing film is no longer maintained. In consideration of this influence of heat, there is proposed such a structure that a cooling fluid passage is formed on an outer peripheral surface of the outer cylinder member which holds two magnetic pole members aligned in the axial direction. The cooling fluid passage is substantially at a center in the axial direction of the magnetic pole members (refer to Patent Citation 1).

The magnetic pole members positioned on right and left sides of the cooling flow passage are cooled by allowing a cooling water to flow into the cooling flow passage. The heat conducted from the high-temperature gas to the outer cylinder member is intercepted before the conduction via the magnetic pole member to the sealing film by the cooled magnetic pole members, the increase in the temperature of the sealing film can thus be suppressed, and the vaporization of the base liquid of the magnetic fluid can be suppressed, thereby increasing the life of the sealing film.

Moreover, there is proposed such a structure that heat radiation plates constructed by multiple recessed grooves are formed on an outer peripheral surface of an outer cylinder member which holds two magnetic pole members aligned in the axial direction. The heat radiation plates are positioned substantially at a center in the axial direction of the magnetic pole members (refer to Patent Citation 2).

As a result, the heat of the magnetic pole member or the sealing film disposed within the outer cylinder member can be released via the outer cylinder member by the heat radiation plates having large surface areas, thereby suppressing a temperature increase in the sealing film.

CITATION LIST

Patent Literature

Patent Citation 1: Japanese Laid-open Patent Publication H10-169789 (Page 7, FIG. 1)

Patent Citation 2: Japanese Laid-open Patent Publication 2003-314706 (Page 5, FIG. 1)

SUMMARY OF THE INVENTION

Technical Problem

However, if the cooling flow passage is provided at the center of the magnetic pole members aligned in the axial direction as described in Patent Citation 1, a temperature environment of the magnetic pole members disposed on an axially inner side of the machine between the high-temperature gas and the cooling flow passage is different from a temperature environment of the magnetic pole member disposed on an axially atmosphere side between the cooling flow passage and the atmosphere. Therefore, when a flow rate of the cooling water flowing through the cooling flow passage is set for a temperature corresponding to the one magnetic pole member on the high-temperature gas side, the temperature of the sealing film of the magnetic pole member on the atmosphere side becomes too low, the high-temperature gas is cooled, byproducts are generated around the sealing film, and the byproducts enter the sealing film, resulting in possible deterioration in a sealability of the sealing film. Moreover, when the flow rate is set for a temperature corresponding to the other magnetic pole member on the atmosphere side, the temperature of the sealing film of the magnetic pole member on the high-temperature gas side becomes too high, the base liquid of the magnetic fluid forming the sealing film vaporizes, and the sealability of the sealing film may deteriorate. Moreover, this deterioration in the sealability may decrease the life of the sealing film. Further, the magnetic fluid seal using the heat radiation plates disclosed in Patent Citation 2 poses the same problems.

The present invention has been made in view of the above-mentioned problems, and therefore has an object to provide a magnetic fluid seal that forms a sealing film extending in an axial direction so as to enable easy determination of a temperature environment, thereby extending the life of the sealing film.

Solution to Problem

In order to achieve the foregoing objective, a magnetic fluid seal according to a first aspect of the present invention comprises:

an outer cylinder member that internally houses a rotating shaft extending from a housing of a fluid machine, and includes an attachment portion to be attached to the housing;

a magnetic pole member that is disposed around the rotating shaft housed in the outer cylinder member, thereby forming a magnetic circuit; and a sealing film that is magnetically connected to the magnetic circuit, is disposed between the magnetic pole member and the rotating shaft, is made from a magnetic fluid, and is formed in an axial direction, the magnetic fluid seal being characterized in that:

the outer cylinder member comprises heat barrier means that reduces heat conducting through the outer cylinder member in the axial direction, and cooling means that cools the outer cylinder member; and the attachment portion, the heat barrier means, the sealing film, and the cooling means are disposed in order on the outer cylinder member in the axial direction thereof.

According to the first aspect, the heat transferred from the housing of the fluid machine to the magnetic pole member and the sealing film can be suppressed by the heat barrier means, and the sealing film can be disposed in an area limited influenced by the heat, the temperature environment of the sealing film formed axially can easily be determined, and the life of the sealing film can be extended.

The magnetic fluid seal according to a second aspect of the present invention may be characterized in that a bearing member is disposed on the rotating shaft for holding a relative rotation between the rotating shaft and the outer cylinder member, and the attachment portion, the heat barrier means, the sealing film, the cooling means, and the bearing member are disposed in order in the axial direction.

According to the second aspect, a cooling action of the cooling means can be exerted also on the bearing member, and a defect of the entire magnetic fluid seal influenced by the heat can be suppressed. Specifically, there can be provided such a structure that can reduce the possibility of deformations by the weight and force resulting from rotation when the heat is applied to the bearing, and that can be used for a fluid equipment from which a rotational accuracy is required.

The magnetic fluid seal according to a third aspect of the present invention may be characterized in that the heat barrier means is heat transfer suppression means.

According to the third aspect, the thermal influence can be suppressed by the heat transfer suppression means, and the heat barrier means can be constructed by a simple configuration.

The magnetic fluid seal according to a fourth aspect of the present invention may be characterized in that the heat barrier means comprises a heat radiation fin provided on an outer peripheral surface of the outer cylinder member.

According to the fourth aspect, a heat exchange is carried out with the atmosphere on a wide surface area by providing the heat radiation fin, a cooling effect is thus provided, even when the outer cylinder member becomes overcooled by the cooling means or overheated by the heat from the housing, the outer cylinder member is maintained at substantially a constant temperature by the heat radiation fin, and the temperature environment of the sealing film can be maintained to be substantially constant.

The magnetic fluid seal according to a fifth aspect of the present invention may be characterized in that the heat barrier means comprises an independent member lower in the heat conductivity than the outer cylinder member.

According to the fifth aspect, the heat barrier effect can be provided more significantly by using, as the heat barrier means, the independent member formed of a low conduction material such a heat insulation material.

DESCRIPTION OF EMBODIMENTS

Modes for implementing the magnetic fluid seal according to the present invention will hereinafter be described based on embodiments. It should be noted that a horizontal direction in FIG. 1 is defined as an axial direction of the magnetic fluid seal, and a vertical direction is defined as a radial direction of the magnetic fluid seal, moreover, a left side in the axial direction is defined as an axial machine interior side, and a right side in the axial direction is defined as an axially atmosphere side.

First Embodiment

First, a description is given of a structure of the magnetic fluid seal shown as the first embodiment.

Figure 1:
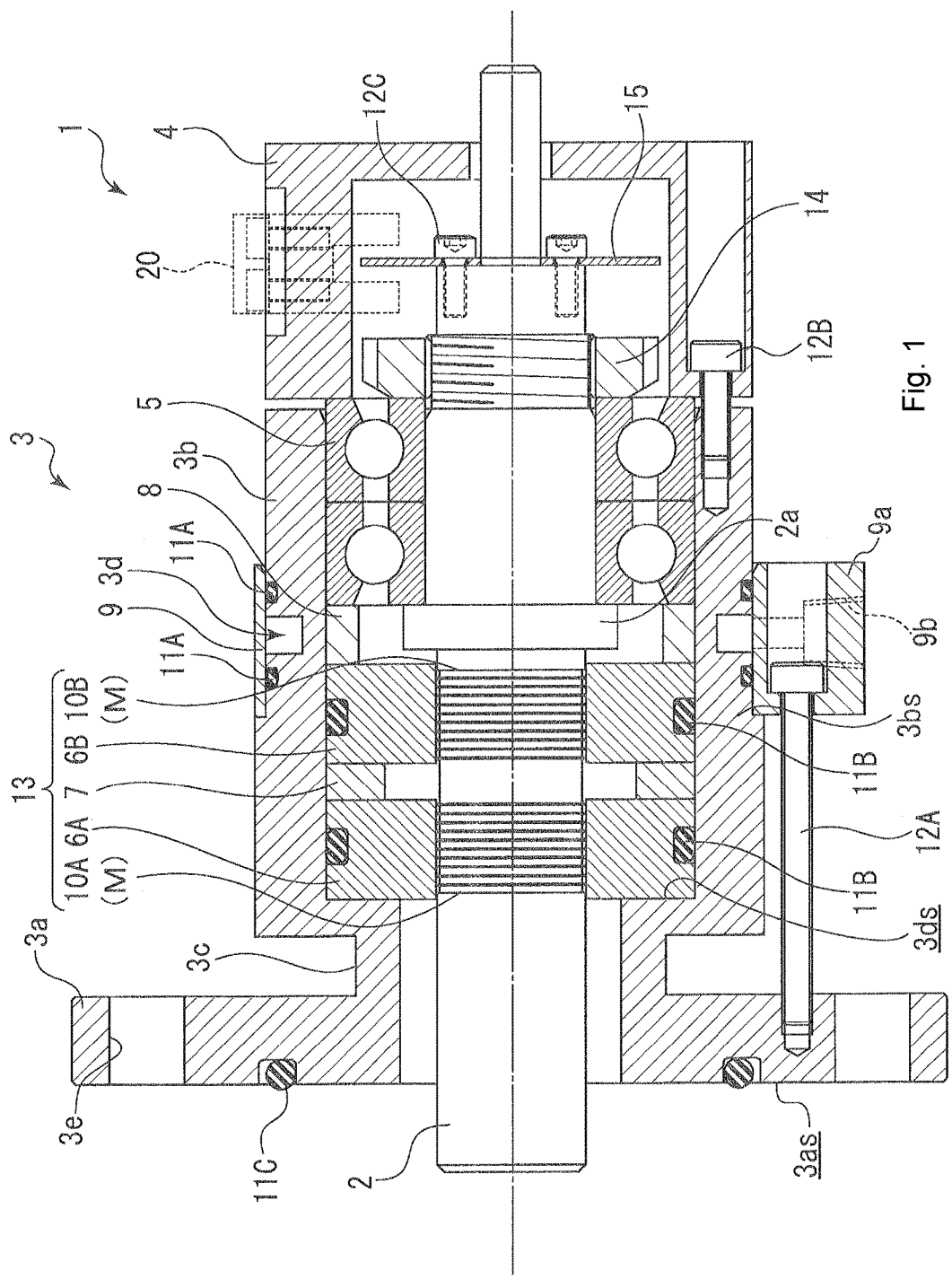
FIG. 1 is a front cross-sectional view showing a first embodiment of the magnetic fluid seal according to the present invention.

As shown in FIG. 1, in a magnetic fluid seal 1 according to the present invention, a sealing part 13 is constructed, as members for exhibiting principal functions, by magnetic pole members 6A and 6B attached to a rotating shaft 2 of a fluid machine, a magnetic force generating means 7 provided between the magnetic pole members 6A and 6B, thereby allowing the magnetic pole members 6A and 6B to form magnetic poles, and magnetic fluids 10A and 10B for forming sealing films M, M along a magnetic circuit formed between the rotating shaft 2 and the magnetic pole members 6A and 6B. The aforesaid structure of the sealing part 13 is capable of sealing a gas or the like (including vacuum) sealed in the fluid equipment by being attached to a housing (not shown) of the fluid equipment, and using the sealing films M, M formed along the rotating shaft 2 to seal a gap between the outer cylinder member 3 of the magnetic fluid seal 1 and the rotating shaft 2.

Moreover, as another structure of the sealing part 13, the magnetic pole member 6A butts against a butting surface $3ds$ corresponding to an axial end face inside an outer cylinder part $3b$ of the outer cylinder member 3 (detailed later), the magnetic pole members 6A and 6B are fit in the outer cylinder part $3b$ while an O-ring 11B is interposed on an outer periphery of each of the magnetic pole members 6A and 6B, a spacer 8 is fit in so as to be in contact with the magnetic pole member 6B positioned on the axially atmosphere side of the sealing part 13. A pair of bearings 5 is further fit on the axially atmosphere side of the spacer 8. Moreover, inner rings of the bearings 5 also axially in contact with a bearing flange $2a$, which is a diameter enlarged part of the rotating shaft 2, is interposed together with outer rings and a rolling body in the radial direction of the outer cylinder member 3 and the rotating shaft 2, and holds the sealing part 13 so that the rotating shaft 2 can relatively rotate smoothly with respect to the outer cylinder member 3.

Moreover, a lock nut 14 is fixed to an end portion of the rotating shaft 2 through threaded engagement on the axially atmosphere side of the bearings 5, as a result, the sealing part 13 is fixed into the outer cylinder part $3b$ of the outer cylinder member 3 while the inner rings of the bearings 5 are pressed into the axially inner side of the machine. An end cap 4 is fit on the axially atmosphere side of the outer rings of the bearings 5, and is fixed to the outer cylinder part $3b$ by hexagon head bolts 12B. An encoder member 15 for detecting a rotation state of the rotating shaft 2 is fixed to an end face of the rotating shaft 2 by hexagon head bolts 12C, and position detection for a position of rotation, a rotation center, or the like are carried out by an electric equipment 20 (such as a photosensor) provided on the end cap 4. It should be noted that the electric equipment 20 is generally constructed by components sensitive to the heat.

The outer cylinder member 3 is made of metal and constructed by a flange part $3a$ serving as an attachment portion to be attached to the housing of the fluid equipment, the outer cylinder part $3b$ in which the sealing part 13, the spacer 8, and the bearings 5 are provided, and a small diameter part 3c, and formed between the flange part 3a and the outer cylinder part 3b. The flange part 3a has a disk-shaped segment having a large diameter in the radial direction. An O-ring 11C is provided on a side of an attachment surface 3 as which is fixed to the housing of the fluid equipment, and multiple attachment holes 3e are provided in a circumference. Moreover, a cooling groove 3d having a recessed cross-sectional shape is provided in the circumference at a center position in the substantially axial direction between the magnetic pole member 6B and the bearings 5 on the outer periphery of the outer cylinder part 3b, and the cooling groove 3d is maintained in a liquid tight state by an outer cylinder cover 9 while O-rings 11A are interposed.

On this occasion, a fixed member 9a including an inlet port 9b is provided at a predetermined position in the circumference on the outer cylinder cover 9. The outer cylinder cover 9 is fixed to the outer peripheral part of the outer cylinder part 3b by using hexagon head bolts 12A inserted into the fixed member 9a to fix the fixed member 9a to the flange part 3a.

Moreover, there is provided such a structure that a cooling action described later is exhibited by allowing a cooling water to flow from the inlet port 9b of the fixed member 9a into the cooling groove 3d.

Next, a description will be given of a temperature state of the magnetic fluid seal 1.

The fluid machine may be used while a high-temperature gas is sealed inside. The high-temperature gas changes from a gas to a solid when the temperature inside the machine becomes equal to or lower than a predetermined temperature, and thus byproducts are generated. As a result of the generation of the byproducts, the byproducts adhere to a periphery of the sealing films N, N, and may thus enter the sealing films M, M, and a sealability of the sealing films M, M deteriorates. If the fluid machine is manufacturing equipment, quality of products to be manufactured by the manufacturing equipment will deteriorate, and therefore the temperature needs to be kept higher than a predetermined temperature Tg. This predetermined temperature Tg differs depending on the type of a gas sealed by the fluid machine, and in the present embodiment Tg is set to Tg>150° C.

As shown in FIG. 1, the flange part 3a provided on the axially inner side of the machine of the magnetic fluid seal 1 is brought into contact with the housing of the fluid machine, and is fixed. Moreover, the rotating shaft 2 is provided so as to continuously extending from the interior of the fluid machine. Further, gaps between the interior of the fluid machine and the sealing films M, M of the magnetic fluid seal 1 is filled with a sealed fluid. Heat inside the fluid machine conducts to the magnetic fluid seal 1, and this heat may adversely affect the magnetic fluid seal 1.

The magnetic fluids 10A and 10B forming the sealing films M, M in the magnetic fluid seal 1 are a solution formed by three materials of ferromagnetic fine grains having magnetism, a surfactant for covering surfaces of the fine grains, and a base liquid made of water or oil.

The water or the oil, which is the base liquid, vaporizes in a high-temperature environment, and the magnetic fluids 10A and 10B lose fluidity by failing to remain in a fluid state. As a result, the sealing films M, M are divided by friction with the outer peripheral surface of the rotating shaft 2. This means that there is brought about such a state where the scalability of the sealing films M, M for the magnetic fluids 10 cannot be maintained. In order to prevent this state, the magnetic fluids 10 need to always be maintained to be lower than a heatproof temperature Ts. The heatproof temperature Ts is changed depending on the type of the magnetic fluid, and in the present embodiment is set to Ts<150° C.

Moreover, such an adverse effect that durability is decreased by the heat and such an adverse effect that deformation caused by the heat results in a lack of rotational accuracy may be exhibited also on the bearings 5 holding the rotating shaft 2 and the outer cylinder part 3b in the radial direction. In order to prevent these adverse effects, the temperature of the bearings 5 needs to always be maintained to be lower than a heatproof temperature Tb. The heatproof temperature Tb is changed depending on materials of components used for the bearings, and in the present embodiment is set to Tb<100° C. Moreover, in terms of the accuracy in rotation detection, the same holds true for the electric equipment components carrying out the position detection such as the position of rotation and the center of rotation, when the electric equipment 20 receives heat equal to or higher than an upper temperature limit of the electric equipment 20. As a result, the electric equipment 20 loses the accuracy in rotation detection, and may no longer be used as the fluid equipment.

A detailed description is now given of the mechanism of conduction of heat from the fluid machine to the magnetic fluid seal 1. As a first route of main routes of the heat transfer, there is solid heat conduction routing through the outer cylinder member 3 in which the heat conducts from the flange part 3a to the outer cylinder part 3b, then conducts from the outer cylinder part 3b to the magnetic pole members 6, and finally conducts from the magnetic pole members 6 to the magnetic fluids 10. Then, as a second route, there is solid heat conduction routing through the rotating shaft 2 in which the heat conducts from the rotating shaft 2 to the magnetic fluids 10. Further, as a third route, there is a gas heat conduction routing through the sealed fluid in which the heat conducts from the gap between the rotating shaft 2 and the outer cylinder member 3 via the high-temperature gas V to the magnetic fluids 10. Moreover, these heat conductions are phenomena simultaneously occurring. It should be noted that a route of heat transfer due to heat radiation also presents strictly, but influence is small, and a description thereof is thus omitted.

As a route of the heat transfer relatively large in the influence, the solid heat conduction routing through the outer cylinder member 3, which is the first route, will be mentioned herein after. The reason is that the flange part 3a of the outer cylinder member 3 has the diametrically increased shape, and is thus larger in a heat transfer area than the rotating shaft 2, and the solid is higher in the heat conductivity than the gas.

In this respect, a small diameter part 3c is provided in the magnetic fluid seal 1 according to the present invention, between the flange part 3a of the outer cylinder member 3 and a seal housing part 3bs of the outer cylinder part 3b inside which the sealing part 13 is provided. As a result, the heat conducting from the flange part 3a to the seal housing part 3bs of the outer cylinder part 3b to which the sealing part 13 is fit, is heat-insulated by the small diameter part 3c having a small heat transfer area.

As a result, a heat quantity conducting to the outer cylinder part 3b on the axially atmosphere side with respect to the small diameter part 3c can be decreased. Therefore, it is possible to suppress the influence of the heat from the fluid machine received by the sealing part 13 positioned on the axially atmosphere side with respect to the small diameter part 3c, and the sealing part 13 can be an area smaller in the thermal influence than the fluid machine and the flange part 3a positioned on the axially inner side of the machine with respect to the small diameter part 3c. In other words, the small diameter part 3c acts as the heat barrier means and further as the heat transfer suppression means according to the present invention.

Therefore, the influence of the heat from the fluid machine can be decreased in the magnetic pole members 6A and 6B constructing the sealing part 13, and temperature states of the right and left magnetic pole members 6A and 6B can be close to each other. As a result, an extreme difference in the temperature environment does not exists between the magnetic fluids 10A and 10B of the right and left magnetic pole members 6A and 6B, and a predetermined sealability of the respective sealing films M, M can be maintained, and the sealability of the magnetic fluid seal 1 can be secured even in a use for a long period.

It should be noted that the heat directly acts on the sealing films M, M in the second and third routes of the heat transfer, and the transfer of the heat cannot thus be insulated completely by providing the small diameter part 3c, but a significant effect can be provided by suppressing the heat transfer on the route large in the influence.

Moreover, in the magnetic fluid seal 1 of the present invention, the cooling groove 3d acting as the cooling means is provided in the outer cylinder part 3b of the outer cylinder member 3 and between the magnetic pole member 6B and the bearings 5 in the axial direction. Therefore, the sealing part 13 and the bearings 5 heat-insulated by the small diameter part 3c from the heat from the high-temperature side can be cooled by the cooling groove 3d, and can be maintained in a state in which the influence from the high-temperature side is small. This means that the right and left magnetic fluids 10A and 10B can be close to each other in the temperature environment, and can be appropriately cooled easily. In other words, sufficient cooling effect can be provided by the cooling groove 3d without excessive cooling.

Moreover, the small diameter part 3c serving as the heat barrier means is positioned in the axially inner side of the machine with respect to the sealing part 13, the cooling groove 3d is positioned in the axially atmosphere side, a large axially temperature gradient in the right and left magnetic fluids 10A and 10B can thus be suppressed by the cooling, and a defect such as heat deformation due to a local difference in the temperature state can be suppressed.

Moreover, the bearings 5 having the heatproof temperature Tb lower than the heatproof temperature Ts of the magnetic fluids 10 are positioned on the axially atmosphere side with respect to the cooling groove 3d, and there is thus provided a configuration that promotes the prevention of an increase in the temperature of the bearings 5.

Next, the small diameter part 3c not only provides the actions and effects as the heat barrier means, but is also formed as the recessed groove, thus has a wide surface area, and has a configuration that promotes radiation of the heat transferred from the flange part 3a to the outside. In other words, the small diameter part 3c provides the heat insulation action of suppressing the transfer of the heat as well as the cooling action of radiating the heat from the surface.

Now, effects of the cooling means on the sealed fluid will be described below. To prevent the generation of such byproducts, it is necessary to hold, at 150° C. or more, the temperature of the high-temperature gas which is the sealed fluid filled on the inner side of the machine than the magnetic fluid 10A as viewed on axial direction. The axial position of the cooling groove 3d and the flow rate of the cooling water are determined by preferably considering this point. More specifically, it is necessary to determine the temperature of the high-temperature gas so that Tg becomes equal to or higher than 150° C., and to set the axial position of the cooling groove 3d and the flow rate of the cooling water so that the settings of Ts<150° C. and Tb<100° C. are satisfied.

Second Embodiment

Next; a structure of the magnetic fluid seal shown as a second embodiment will be described. It should be noted that a description of the same component as that of the first embodiment is omitted.

Figure 2:
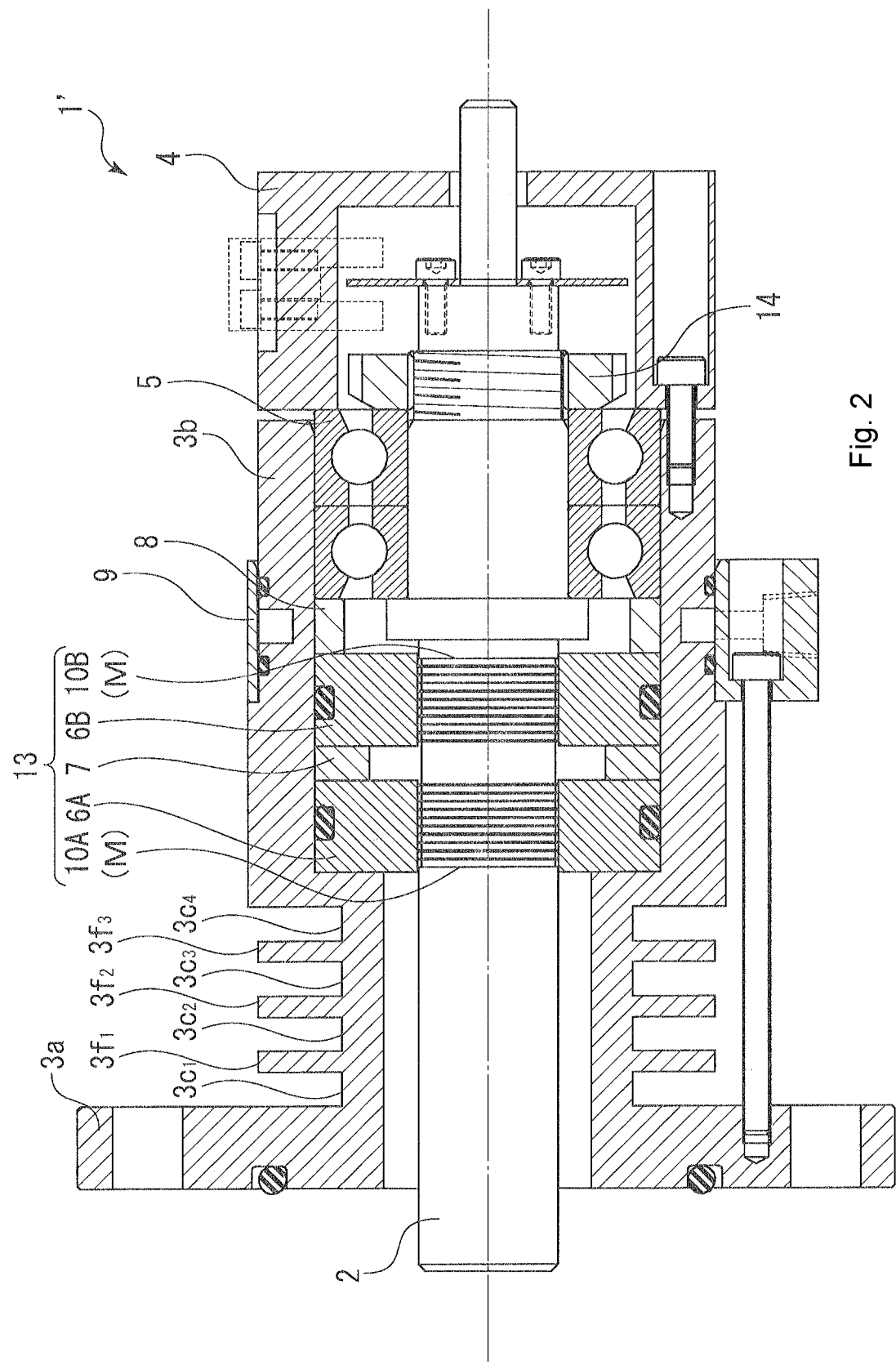
FIG. 2 is a front cross-sectional view showing a second embodiment of the magnetic fluid seal according to the present invention.

As shown in FIG. 2, in the magnetic fluid seal 1' shown as the second embodiment, small diameter parts $3c_1$, $3c_2$, $3c_3$, and $3c_4$ and circular flat plates $3f_1$, $3f_2$, and $3f_3$ as so-called fins extending radially outward between the small diameter parts are provided between the flange part 3a and the outer cylinder part 3b. Since the small diameter parts $3c_1$, $3c_2$, $3c_3$, and $3c_4$ and the fins constituted by the circular flat plates $3f_1$, $3f_2$, and $3f_3$ are provided thus, the surface area between the flange part 3a and the outer cylinder part 3b become large, thereby resulting in a more significant heat radiation effect. In other words, the small diameter parts $3c_1$, $3c_2$, $3c_3$, and $3c_4$ act as the heat barrier means according to the present invention, and also the circular flat plates $3f_1$, $3f_2$, and $3f_3$ forming the heat radiation fins act as the heat barrier means. As a result of the provision of the heat radiation fins in this way, not only the heat from the high-temperature gas can be radiated, but also heat exchange of the heat radiation fins with the atmosphere can prevent the housing from excessively being cooled even if the cooling action by the cooling groove 3d excessively acts, thereby preventing the temperature of the high-temperature gas inside the machine from decreasing.

Third Embodiment

Next, a structure of the magnetic fluid seal shown as the third embodiment will be described. It should be noted that a description of the same component as that of the first embodiment is omitted.

Figure 3:
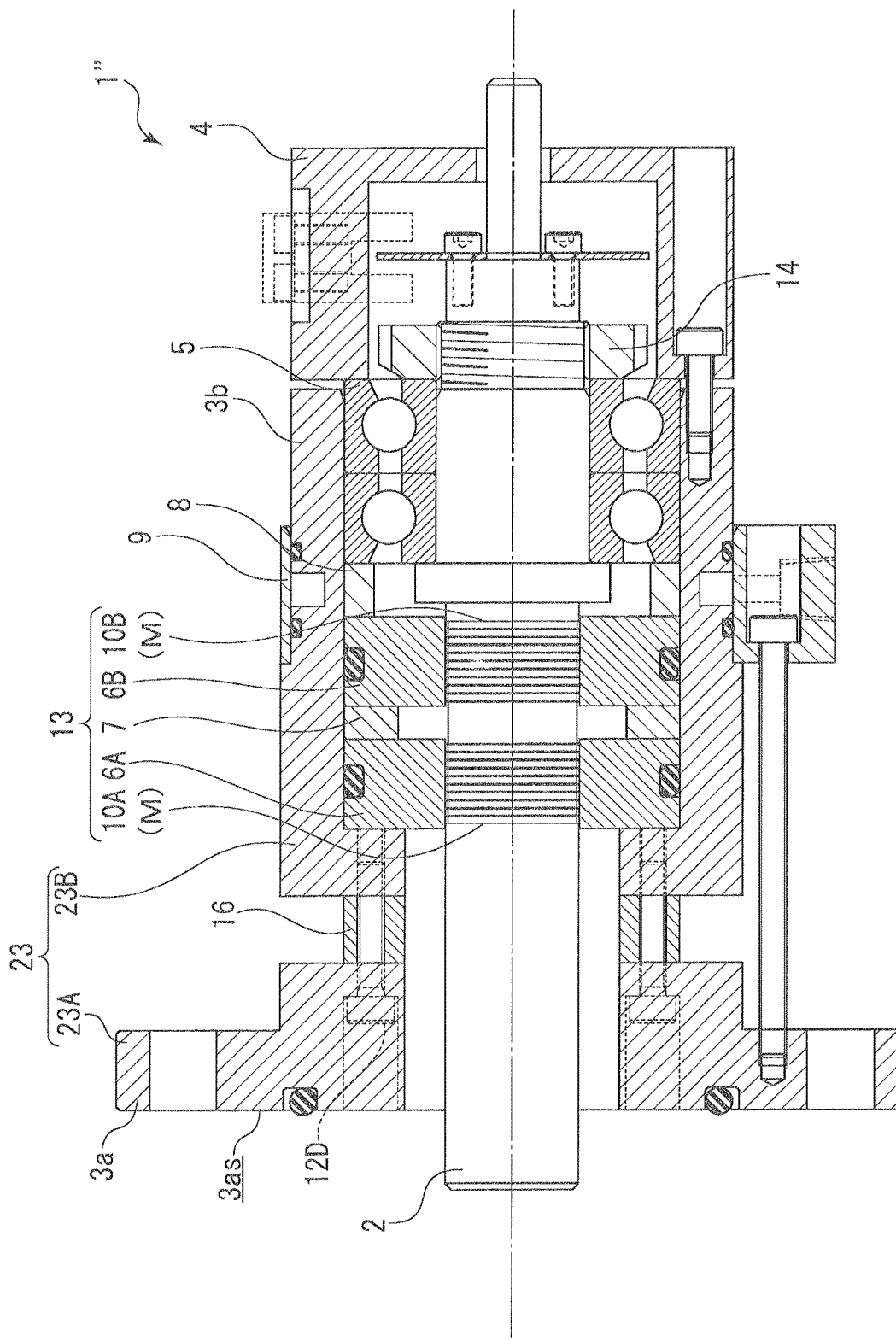
FIG. 3 is a front cross-sectional view showing a third embodiment of the magnetic fluid seal according to the present invention.

As shown in FIG. 3, in a magnetic fluid seal 1" shown as the third embodiment, the outer cylinder member 23 is constructed by independent members, which are a flange member 23A and an outer cylinder member 23B. The flange member 23A and the outer cylinder member 23B are fixed by hexagon bolts 12D inserted from the attachment surface 3as of the flange member 23A while a small diameter member 16 less in the diameter in the radial direction than the outer cylinder member 23B is interposed between the flange member 23A and the outer cylinder member 28B.

The small diameter member 16 is a member in a ring shape smaller in the diameter in the radial direction than the outer cylinder member 23B, and, for example, a polyetheretherketone material may be employed as a material of the small diameter member 16 for a resin molded component excellent in the heat resistance and the mechanical strength. In this way, the heat transfer can be significantly suppressed by disposing the member lower in the heat transfer rate than metal between the flange member 23A and the outer cylinder member 23B. In other words, the small diameter member 16 acts as the heat barrier means according to the present invention.

It should be noted that the material of the small diameter member 16 may be a resin material other than the resin material described above, metal, or other material as long as the material is lower in the heat transfer rate than the outer cylinder member 23, and the shape of the small diameter member 16 may be the same in the diameter as the outer cylinder member 23B, or larger in the diameter than the outer cylinder member 23B.

A description has been given of the embodiments of the magnetic fluid seal according to the present invention referring to the drawings, but the specific configurations of the present invention are not limited thereto, and configurations including modifications or additions made within a scope not departing from the gist of the present invention are also included in the present invention.

For example, though the rectangular sectional grove is described as an example of the small diameter part 3c serving as the heat barrier means in the embodiments, the shape of the small diameter part 3c does not matter, and the small diameter part 3c may be a U-shape sectional groove or a V-shape sectional groove. Moreover, multiple small diameter parts 3c may be further provided axially.

Moreover, though the cooling groove 3d serving as the cooling means is described as the groove into which the fluid flows in the embodiments, the cooling groove 3d may have an air-cooled configuration in which gas flows into the cooling groove 3d. The shape of the cooling groove 3d is not limited to that of the circumferential groove, and the shape of the cooling groove 3d may be arbitrarily selected.

Moreover, though the sealing part 13 is constructed by the two magnetic pole members 6A and 6B in the embodiments, the sealing part 13 may be constructed by one magnetic pole member or three or more magnetic pole members.

REFERENCE SIGNS LIST

1 Magnetic fluid seal
2 Rotating shaft
3 Outer cylinder member
3a Flange part (attachment portion)
3b Outer cylinder part
3c Smaller diameter part (heat barrier means) (heat transfer suppression means)
3d Cooling groove (cooling means)
3f Circular flat plate (heat barrier means) (heat radiation fin)
5 Bearing (bearing member)
6 Magnetic pole member
7 Magnetic force generating means
10 Magnetic fluid
16 Small diameter member (heat barrier means)
23 Outer cylinder part
23A Flange member
23B Outer cylinder member
M Sealing film

The invention claimed is:

1. A magnetic fluid seal comprising:
an outer cylinder member that internally houses a rotating shaft extending from a housing of a fluid machine, and includes an attachment portion to be attached to the housing;
a magnetic pole member that is disposed around the rotating shaft housed in the outer cylinder member, thereby forming a magnetic circuit; and
a sealing film that is magnetically connected to the magnetic circuit, is disposed between the magnetic pole member and the rotating shaft, is made from a magnetic fluid, and is formed in an axial direction, wherein:
the outer cylinder member comprises a heat barrier adapted to reduce heat conducting through the outer cylinder member in the axial direction, and a heat exchanger adapted to cool the outer cylinder member; and
the attachment portion, the heat barrier, the sealing film, and the heat exchanger are disposed in order on or within the outer cylinder member in the axial direction thereof.

2. The magnetic fluid seal as set forth in claim 1, wherein:
a bearing member is disposed on the rotating shaft for holding a relative rotation between the rotating shaft and the outer cylinder member; and
the attachment portion, the heat barrier, the sealing film, the heat exchanger, and the bearing member are disposed in order in the axial direction.

3. The magnetic fluid seal as set forth in claim 2, wherein:
the heat barrier is a heat transfer suppressor.

4. The magnetic fluid seal as set forth in claim 2, wherein:
the heat barrier comprises a heat radiation fin provided on an outer peripheral surface of the outer cylinder member.

5. The magnetic fluid seal as set forth in claim 2, wherein:
the heat barrier comprises an independent member lower in heat conductivity than the outer cylinder member.

6. The magnetic fluid seal as set forth in claim 1, wherein:
the heat barrier is a heat transfer suppressor.

7. The magnetic fluid seal as set forth in claim 6, wherein:
the heat barrier comprises a heat radiation fin provided on an outer peripheral surface of the outer cylinder member.

8. The magnetic fluid seal as set forth in claim 6, wherein:
the heat barrier comprises an independent member lower in heat conductivity than the outer cylinder member.

9. The magnetic fluid seal as set forth in claim 1, wherein:
the heat barrier comprises a heat radiation fin provided on an outer peripheral surface of the outer cylinder member.

10. The magnetic fluid seal as set forth in claim 9, wherein:
the heat barrier comprises an independent member lower in heat conductivity than the outer cylinder member.

11. The magnetic fluid seal as set forth in claim 1, wherein:
the heat barrier comprises an independent member lower in heat conductivity than the outer cylinder member.

* * * * *